(12) United States Patent
Papadopoulos et al.

(10) Patent No.: US 8,688,154 B2
(45) Date of Patent: *Apr. 1, 2014

(54) METHOD AND APPARATUS FOR COMMUNICATING WITH BLIND INTERFERENCE ALIGNMENT USING POWER ALLOCATION AND/OR TRANSMISSION ARCHITECTURE

(75) Inventors: Haralabos Papadopoulos, San Jose, CA (US); Sean A. Ramprashad, Los Altos, CA (US); Chenwei Wang, Irvine, CA (US)

(73) Assignee: NTT DoCoMo, Inc., Tokyo (JP)

( * ) Notice: Subject to any disclaimer, the term of this patent is extended or adjusted under 35 U.S.C. 154(b) by 279 days.

This patent is subject to a terminal disclaimer.

(21) Appl. No.: 13/223,762

(22) Filed: Sep. 1, 2011

(65) Prior Publication Data
US 2012/0058788 A1 Mar. 8, 2012

Related U.S. Application Data

(60) Provisional application No. 61/379,668, filed on Sep. 2, 2010.

(51) Int. Cl.
*H04W 24/02* (2009.01)
*H04B 15/00* (2006.01)

(52) U.S. Cl.
USPC ........ 455/501; 455/63.1; 455/509; 455/67.13

(58) Field of Classification Search
USPC .......... 455/501, 63.1, 446, 452.1, 450, 452.2, 455/509, 522, 69, 524, 67.11, 67.13; 370/315, 252, 311, 328
See application file for complete search history.

(56) References Cited

U.S. PATENT DOCUMENTS

| 2008/0181097 | A1* | 7/2008 | Goldberg et al. | 370/210 |
| 2010/0075687 | A1 | 3/2010 | Chayat | |
| 2011/0200126 | A1* | 8/2011 | Bontu et al. | 375/260 |
| 2012/0008511 | A1* | 1/2012 | Fan et al. | 370/252 |
| 2013/0176881 | A1* | 7/2013 | Fan et al. | 370/252 |

OTHER PUBLICATIONS

PCT International Search Report for related PCT Patent Application No. PCT/US2011/050374, Mar. 2, 2012, 7 pgs.
PCT Written Opinion of the International Searching Authority for related PCT Patent Application No. PCT/US2011/050374, Mar. 2, 2012, 12 pgs.

(Continued)

*Primary Examiner* — John J Lee
(74) *Attorney, Agent, or Firm* — Blakely, Sokoloff, Taylor & Zafman LLP

(57) ABSTRACT

A method and system are disclosed herein for power allocation and/or clustering in a wireless communication system that uses blind interference alignment. In one embodiment, the system comprises a plurality of receivers, where each receiver in the plurality has a multi-mode antenna with a single radio frequency (RF) chain that is operable in a plurality of antenna modes, and wherein each receiver shifts between the plurality of antenna modes in a predetermined manner. The system also includes a plurality of base stations to perform cluster-based transmission, each base station in the plurality of base stations having one or more transmitters having a transmit antenna and being operable to communicate with one or more of receivers in the plurality of receivers using a blind interference alignment (BIA) scheme, and wherein the plurality of base stations are grouped in different clusters at different times according to cluster patterns.

25 Claims, 7 Drawing Sheets

(56) References Cited

OTHER PUBLICATIONS

PCT Partial International Search for related PCT patent application No. PCT/US2011/050374, Dec. 1, 2011, 8 pgs.

Wang et al., "Aiming Perfectly in the Dark—Blind Interference Alignment through Staggered Antenna Switching", URL: http://arxiv.org/PS_cache/arxiv/pdf/1002/1002.2720v1.pdf.

Caire et al., "Multiuser MIMO Downlink with Limited Inter-Cell Cooperation: Approximate Interference Alignment in Time, Frequency and Space", 46th Annual Allerton Conference on Communication, Control and Computing, Sep. 23, 2008, pp. 730-737, IEEE, Piscataway, New Jersey, USA.

Yu et al., "Transmitter Optimization for the Multi-Antenna Downlink With Per-Antenna Power Constraints", IEEE Transactions on Signal Processing, Jun. 1, 2007, pp. 2646-2660, vol. 55, No. 6, IEEE Service Center, New York, NY, USA.

Debbah et al., "Outage Efficient Strategies for Network MIMO with Partial CSIT", IEEE International Symposium on Information Theory, Jun. 28, 2009, pp. 249-253, IEEE Piscataway, New Jersey, USA.

Chenwei Wang et al: "Aiming Perfectly in the Dark—Blind Interference Alignment through Staggered Antenna Switching", arTiv—Computer Science, Information Theory, Feb. 15, 2010.

Caire G et al: "Multiuser MIMO downlink with limited inter-cell cooperation: Approximate interference alignment in time, frequency, and space", Communication, Control, and Computing, 2008 46th Annual Allerton Conference on, Sep. 23, 2008.

Wei Yu et al: "Transmitter Optimization for the Multi-Antenna Downlink With Per-Antenna Power Constraints", IEEE Transactions on Signal Processing, vol. 55, No. 6, Jun. 1, 2007.

Debbah M et al: "Outage efficient strategies for network MIMO with partial CSIT", ISIT 2009, Jun. 28, 2009.

PCT Preliminary Report on Patentability for related PCT patent application No. PCT/US2011/050374, Mar. 14, 2013, 13 pages.

\* cited by examiner

Can be implemented as and in some embodiments implemented as

METHOD AND APPARATUS FOR COMMUNICATING WITH BLIND INTERFERENCE ALIGNMENT USING POWER ALLOCATION AND/OR TRANSMISSION ARCHITECTURE

PRIORITY

The present patent application claims priority to and incorporates by reference the corresponding provisional patent application Ser. No. 61/379,668, titled, "A Method to Deploy Efficient Blind Interference Alignment Using a Combination of Power Allocation and Transmission Architecture," filed on Sep. 2, 2010.

FIELD OF THE INVENTION

Embodiments of the present invention relate to the field of Multiple Input Multiple Output (MIMO) wireless transmission systems; more particularly, embodiments of the present invention relates to Blind Interference Alignment (BIA) techniques that can be used to support Multi-User MIMO (MU-MIMO) transmission.

BACKGROUND OF THE INVENTION

Many recent advances in wireless transmission have rested on the use of multiple antennas for transmission and reception. Multiple antennas, fundamentally, can provide an increase in the numbers of Degrees of Freedom (DoFs) that can be exploited by a wireless system for transmission. Here, DoFs can be used to provide increased spectral efficiency (throughput) and/or added diversity (robustness). Indeed, a Single User MIMO (SU-MIMO) system with $N_t$ transmission antennas serving a single user with $N_r$ receive antennas may be able to exploit up to $\min(N_t, N_r)$ DoFs for downlink transmission. These DOFs, for example, can under certain conditions be used to improve throughput by a factor that grows linearly with $\min(N_t, N_r)$. Such benefits of MIMO, and increased DoFs, underlie much of the interest in using MIMO in new and future systems.

Exploiting such DoFs often requires some amount of cost to the system. One such cost is knowledge of the channel state between transmitting and receiving antennas. Such Channel State Information (CSI) often has to be available to either the transmitter (such CSI is termed CSIT) and/or to the receiver (such CSI is termed CSIR). The DoFs available also depend on having sufficient "richness" in the channels between transmitting and receiving antennas.

For example, SU-MIMO CSIR-based systems such as Bit Interleaved Coded Modulation (BICM) and D-BLAST can achieve the maximum $\min(N_t, N_r)$ DoFs under suitable channel conditions. Under such conditions, they therefore can be used to provide corresponding linear increases in spectral efficiency. Such designs are well understood by those familiar with the state of the art.

Similarly, a Multi-User MIMO (MU-MIMO) system with $N_t$ transmission antennas at the base station and K single-antenna users ($N_r=1$) can provide up to $\min(N_t, K)$ DoFs. As in the case of SU-MIMO, MU-MIMO can, for example, be used to improve throughput linearly with $\min(N_t, K)$. However, unlike SU-MIMO, many MU-MIMO techniques (in fact most if not all of the prevailing MU-MIMO techniques used and studied for standards) require knowledge of CSIT. MU-MIMO based on CSIT, unlike SU-MIMO based on CSIR, requires additional overheads to estimate CSI and feedback CSI to transmitters before the transmission can even take place. Despite such overheads, MU-MIMO is of practical interest since it has the benefit over SU-MIMO of being able to grow the DoFs without having to add many receive antennas, radio frequency (RF) chains, or increase processing (e.g. decoding) complexity to portable or mobile devices.

The issue of CSI overhead has to be considered carefully. It is a fundamental issue often overlooked in assessing conventional MIMO. Such CSI-related overhead in fact can represent a fundamental "dimensionality bottleneck" that can limit the net spectral efficiency increase that can be obtained with conventional CSI-dependent MIMO.

In particular, if one wants to continue to exploit the growth in DoFs (e.g. linear growth) by increasing $N_t$ (or $N_r$ or K), one also has to consider how to support increased system overhead in obtaining the CSI required to formulate transmissions and decode at the receivers. Such overhead can include increased use of the wireless medium for pilots supporting CSI estimation and increased feedback between receiving and transmitting entities on such CSI estimates.

As an example, assume that for each complex scalar value that defines the CSI between a single TX antenna and a single RX antenna (this type of CSI is often termed direct CSI by some in the Standards community) a fixed percentage $F_{csi}$ of wireless-channel resources is dedicated to pilots and/or feedback. One can easily see that as the dimension of the CSI required scales with quantities like $N_t$, $N_r$ and/or K, the total CSI system-related overhead grows (e.g., by $N_t \times F_{csi}$). For example, for K single antenna users, each with $N_t$ CSI scalar terms with respect to the transmitting antenna, there are $KN_t$ such scalars. Supporting an increase in the dimension of the CSI can take more wireless-channel resources, and reduces the amount of resources left for data transmission. This overhead increase can limit continued growth in throughput if spectral efficiency improvements do not offset increased CSI overheads.

The value $F_{csi}$ is often defined either by the system or by necessity given the coherence of channels in time and/or frequency. As the state of channels changes more rapidly in time and/or frequency, more resources may need to be used to estimate and keep track of CSI.

As an example, in a Frequency Division Duplex (FDD) based 3GPP Long Term Evolution (LTE) design, 8 symbols in a resource block of 12×14 OFDM symbols are used to support downlink pilots for each of the $N_t$ antennas. Simply considering system overheads for such pilots, and ignoring other CSI related overheads such as feedback, $F_{csi} \geq 8/168 = 4.76\%$. It means that with $N_t=8$, assuming the pilot structure scales linearly with additional antennas, the total CSI-overhead is at least on the order of 38%, leaving no more than 62% of symbols for supporting data transmission. Clearly, such a system would not support unbounded increases in $N_t$.

Thus, though symbols which carry coded data information are used more efficiently, with increased robustness and/or spectral efficiency due to the increased DoFs by MIMO, the net spectral efficiency increases has to account for the CSI overhead. Thus, the net spectral efficiency growth is in fact less than that of individual data symbols as only a fraction of no more than $(1-N_t \times F_{csi})$ of symbols can be used for data.

Recently a new class of techniques, termed "Blind Interference Alignment" (BIA) techniques, has demonstrated the ability to grow DoFs without requiring many of the CSI overheads of conventional MU-MIMO systems. It is possible for a Multi-User MIMO (MU-MIMO) system with $N_t$ transmission antennas at the basestation and K single active-antenna users to achieve $KN_t/(K+N_t-1)$ DoFs without CSIT. Thus, as K grows, the system can approach the CSI-dependent upper bound of $\min(N_t, K)$ DoFs. This is a striking result since it goes ahead of much of the conventional thinking and conjectures over recent decades, and it provides the potential to relieve the "dimensionality bottleneck" being faced by current systems.

For such a system to work, there is a requirement that the single active-receive antenna of a user be in fact a multi-mode antenna, having a single RF chain, but able to switch between $N_t$ modes in a pre-determined fashion. The modes must be able to create independent (e.g., linearly independent) CSI vectors for the single user. Transmission also has to be confined to a suitable coherence interval in time and frequency over which the CSI in a given mode, though unknown to the system, is assumed to be effectively constant and different from mode to mode.

The BIA technique works by creating a suitable antenna mode switching and combined data transmission vector over the K information bearing streams that are to be sent to the K users (one stream carries the intended information for one user). Such information bearing stream themselves are vectors. These are sent in various arithmetic combinations simultaneously thus using the extra DoFs provided by the antenna mode switching.

The coordination of user receive-antenna switching modes and the way the information streams are sent by the BIA scheme is designed to maximize the DoFs by complying with the following principles:

- Any $N_t$ dimensional symbol intended for a given user is transmitted through $N_t$ slots.
- During these $N_t$ slots, the antenna-switching pattern of that user ensures that the user observes that symbol through all its $N_t$ antenna modes (thereby in an $N_t$ dimensional space) and can thus decode it.
- In contrast, the antenna-switch patterns of the rest of the users are such that the transmission of this $N_t$ dimensional symbol only casts an 1-dimensional shadow to their receivers. This is accomplished by ensuring that each of these receivers uses the same antenna mode in all the $N_t$ dimensional symbol is transmitted.

Thus, a total of $(N_t+K-1)$ receiver dimensions are needed per user to decode $N_t$ scalar symbols. As a result, with this scheme, K users decode a total of $KN_t$ symbols ($N_t$ each) per (Nt+K−1) channel uses, thereby achieving the maximum possible BIA DoF of $KN_t/(N_t+K-1)$.

BIA techniques do have some inherent challenges and limitations in the scenarios in which they can be used. The first inherent problem is that they often require high Signal to Noise Ratios (SNRs) to operate effectively, e.g. the original BIA scheme may require up to 20 dB of SNR. This is due to a property of the interference alignment process which results in noise being amplified in the resulting interference-aligned streams. As a consequence of this, the original BIA technique has limited application to many users in a cellular environment. For example cell-edge users that often experience Signal to Interference plus Noise Ratios (SINRs) on the order of 0 dB or less. Note, the interference coming from interfering cells not serving the K users, thus making it for the purpose of analysis effectively noise. Many users, not just cell-edge users, do not have SINRs on the order of 20 dB or more. Unfortunately, it is such lower SNR users that are often the ones that need techniques to help them boost their spectral efficiency. High SNR users can often use simple MIMO or Single Input Single Output (SISO) techniques with satisfactory rates. The BIA scheme therefore requires modification and a proper deployment setup to enable it to be useful to many users in a cellular environment.

SUMMARY OF THE INVENTION

A method and system are disclosed herein for power allocation and/or clustering in a wireless communication system that uses blind interference alignment. In one embodiment, the system comprises a plurality of receivers, where each receiver in the plurality has a multi-mode antenna with a single radio frequency (RF) chain that is operable in a plurality of antenna modes, and wherein each receiver shifts between the plurality of antenna modes in a predetermined manner. The system also includes a plurality of base stations to perform cluster-based transmission, each base station in the plurality of base stations having one or more transmitters having a transmit antenna and being operable to communicate with one or more of receivers in the plurality of receivers using a blind interference alignment (BIA) scheme, and wherein the plurality of base stations are grouped in different clusters at different times according to cluster patterns.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
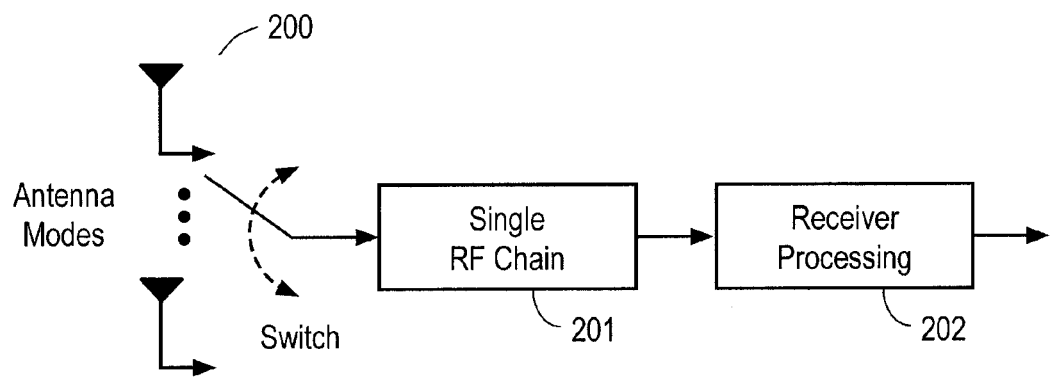
FIG. 1 is a block diagram of one embodiment of a multi-mode receiver.

Embodiments of the invention include a method and wireless communication system. The wireless communication system uses a deployment strategy to improve the performance of the BIA technique, and leverage the inherent benefits BIA has in terms of reduced CSI costs. The deployment strategy combines BIA with cluster-based transmission. This enables users to see more favorable SNR (and SINR) conditions on some time and/or frequency resource. In one embodiment, the power allocation of transmitted streams is also adjusted. This adjustment over the allocation of the original BIA scheme reduces the SNR requirement of the underlying BIA technique itself. When users are correctly scheduled across such resources and cluster patterns, with BIA applied in a cluster-based fashion and improved by power allocation, the BIA technique can become quite attractive for a wider range of users, including cell-edge users.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview of Embodiments of the Invention

Embodiments of the invention include techniques for improved BIA transmissions in a cellular environment. One such technique includes adjusting the power per transmitted slot or power per block of transmitted symbols to improve the performance of the underlying BIA technique itself. Another technique is to deploy BIA in an architecture scenario based on transmission across clusters of stations. With such a deployment, a given set of transmission symbols (a transmission stream) of a given BIA scheme is carried over clusters of base-stations (BSs). This further increases the operational SNR and SINR of streams, which improves BIA performance.

Note, in BIA cluster-based transmission, in one embodiment, each station in a cluster has only the information streams of users in order to create the necessary signal for transmission. This stream/signal can be computed at individual base-stations based solely on data intended for users, without the need for CSIT. Thus, unlike techniques such as coordinated MU-MIMO across stations (known also as Network MIMO or Coordinated Multipoint Transmission with Joint Processing—termed CoMP-JP), there is no need to use CSI, exchange CSI, code information and disseminate coded streams across stations, or apply beamforming vectors to coded streams across stations in a cluster. Thus in addition to eliminating CSIT requirements at stations, the BIA scheme simplifies transmission operations necessary in computing streams and transmission signals and in coordinating BSs. All that is required by BIA is that the receivers change their receive antenna mode in a known (pre-determined) fashion for a given choice of BIA scheme.

Overall, the techniques described herein allow BIA to serve a much wider range of users (range of user SNRs and SINRs) with improved performance over SU-MISO and without the dimensionality bottleneck of traditional CSIT-based MU-MIMO.

Overview of the Original BIA

To help understand the techniques described herein, portions of the original BIA scheme is described below. Note that the original BIA scheme is well known by those skilled in the art. For information, see C. Wang, et al, "Aiming Perfectly in the Dark—Blind Interference Alignment through Staggered Antenna Switching", February 2010, (hereinafter "Wang"). For simplicity, the variable M is used in place of $N_t$ in the discussion to follow.

The original BIA scheme includes a method for communicating to K receivers from a single set of M transmit antennas. Such antennas may be located at one common base station (BS) location. Such antennas, as in embodiments of the invention, may be located at one or more BS or remote locations. For purposes herein, the term "base station" refers to a location with a transmit antenna, though certainly a location could be supported by a remote antenna connected by a wire or fiber to a geographically separate control entity as done in a Distributed Antenna Systems (DAS).

Each of the K receivers itself has M antennas modes. Such modes can be realized, for example, by M physical antennas, though this does not necessarily need to true. For example, it may be possible to produce such modes with a single antenna which could be made to physically move or adjust sensitivity patterns in space.

The M modes cannot support a true multi-antenna receiver having $N_r=M$, as used in SU-MIMO. In particular, and unlike a SU-MIMO receiver, in BIA, each receiver is assumed to have only a single Radio Frequency (RF) chain. An example of one such receiver is shown in FIG. 1 where single RF chain 201 switches between various antenna 200 and interfaces antennas 200 with receiver processing 202. As a result of having only a single RF chain, effectively $N_r=1$ and only one receive antenna (one receive antenna mode) can be active (i.e., can be receiving transmissions) in a given time slot. Thus, as with receivers for CSIT-based MU-MIMO, there are benefits of having a single RF chain to lower hardware and processing complexity at the receiver (e.g., a mobile device).

For the purposes of exposition, it is assumed that the (average) transmit power per time-frequency slot in the system is "$P_{slot}$". The BIA scheme for a given M and K, i.e. BIA (M,K), is presented in Wang. The scheme transmits, from the set of M antennas, an average of M/(M+K−1) coded symbols to each of the K users. It can be shown that this is the maximum for any such alignment scheme and is achieved by:

cycling through the receive antenna modes at each terminal in a jointly coordinated way; and systematically transmitting all the user symbols through the M transmit antennas, such that each user can pick out measurements only containing its own symbols (in noise but with no interference from other user symbols).

More specifically, the scheme transmits to each user a set of M-dimensional vectors of symbols. Transmitting a single M-dimensional symbol over the M antennas means that the $i^{th}$ entry of the vector is transmitted over the $i^{th}$ transmit antenna, for i=1, 2, ..., M.

An alignment process uses L "slots" to deliver to each user k (k=1, 2, ..., K) a set of "N" M-vector transmission "symbols" $s_1^{[k]}, s_2^{[k]}, \ldots, s_N^{[k]}$, where $s_t^{[k]}$ represents symbols carrying useful information for user k. There are a total of NK such M-vectors over all users.

Each aforementioned "slot" can represent a single time or frequency resource, or a block thereof. For example, a slot could represent a block of OFDM symbols, in which case the symbol $s_t^{[k]}$ is an M-dimensional quantity where each dimension represents a block of OFDM symbols. For simplicity, it is assumed that each dimension of $s_i^{[k]}$ is simply a "symbol".

The values of "N" and "L" are systematically determined in Wang and satisfy, $$L=N(M+K-1).$$

Thus, the average number of "symbols" provided by the alignment method to each user within the L "slots" is given by $$M \times \frac{N}{L} = \frac{M}{M+K-1}$$

Since this happens over the K users simultaneously, the average number of "independent slots" (DoFs) that the system can support (without interference) is $$K \times M \times \frac{N}{L} = \frac{KM}{M+K-1}$$

According to the original BIA method in Wang, the block of length L comprises two types of subblocks that are referred to herein as alignment blocks type-1 and type-2, which are described below.

Alignment Block Type-1:

Block type-1 has a length of N(M−1). In each slot of alignment block type-1, the transmitter transmits the sum of K M-dimensional vector symbols, where one symbol applies to each user. These symbols are selected in a systematic way to ensure all information bearing symbols are decodable at their intended receiver (user). Examples later illustrate this point.

Alignment Block Type-2:

Blocks of type-2 have length NK. In each slot of the block of type-2, the transmitter transmits only one vector symbol which is used to eliminate the interference at unintended receiver. In particular, the transmitter uses a subset of N slots from the total of NK for a given user. In the N slots for a user, all the N user symbols of that user are sent.

In order to ensure that each user can decode its own symbol stream, while transmissions are being sent, each user has to cycle through its set of M antenna modes in a predetermined and user-specific manner based on the pre-determined definition of what combination of user vectors are transmitted in each slot.

In particular, let $h_m^{[k]}$ denote the 1×M channel vector between the M transmit antennas and the m-th receive antenna mode of the k-th user (where the m-th antenna mode of a user corresponds to use of the m-th receive antenna mode with the single RF chain for that user).

Let also $a^{[k]}(t)$ denote the index of the antenna mode selected by user k in slot t for t=1, 2, ..., L. Then the following 1×L vector captures the sequence of modes cycled by user k within a given alignment block:

$$a^{[k]}=[a^{[k]}(1)a^{[k]}(2) \ldots a^{[k]}(L)]$$

Below is a representative example of the coordinated symbol-user transmissions based on the original BIA scheme presented in Wang. The extensions of these schemes that are of use with the techniques disclosed herein are presented next.

Example 1

Original BIA scheme with M=2, K=2

Encoding and Transmission:

This is the easiest and most illustrative case of the BIA process. In this case the alignment code has length L=3. It delivers to each user, user k=1 and user k=2, a single 2 dimensional symbol (or block of 2-dimensional symbols). That is, N=1.

Let $s^{[k]}$ denote the 2×1 coded symbol (or coded block) for users k, for k=1 and 2, and x(t) denote the transmitted signal (an M-dimensional quantity) at slot t. The code is as follows:

$$x = \begin{bmatrix} x(1) \\ x(2) \\ x(3) \end{bmatrix} \quad \text{(equation 1)}$$

where $[x(1) = s^{[1]} + s^{[2]}] \leftarrow$ Block type-1

$\begin{bmatrix} x(2) = s^{[1]} \\ x(3) = s^{[2]} \end{bmatrix} \leftarrow$ Block type-2

Here a stream $s^{[k]}$ is a vector of two dimensions of the form $$s^{[k]} = \begin{bmatrix} u_1^{[k]} \\ u_2^{[k]} \end{bmatrix}$$

where $u_1^{[k]}$ is $i^{th}$ the information bearing stream supporting data intended for user k.

Recall that each "symbol" can refer to a single numerical value, or can signify a block of such symbols. For simplicity in exposition, the word "symbol" refers herein to either case.

In order to facilitate interference alignment and decoding at each of the two receivers, the antenna modes are switched at each receiver according to $$a^{[1]} = [1\ 2\ 1], a^{[2]} = [1\ 1\ 2] \quad \text{(equation 2)}$$

This means that user k=1 uses its modes 1, 2 and 1 for blocks 1, 2, and 3 respectively. If one considers the receive signal at user k=1 with such mode switching it has the following form:

$$y = \begin{bmatrix} y^{[1]}(1) \\ y^{[1]}(2) \\ y^{[1]}(3) \end{bmatrix} \quad \text{(equation 3)}$$

$$= \begin{bmatrix} h^{[1]}(1) & 0 & 0 \\ 0 & h^{[1]}(2) & 0 \\ 0 & 0 & h^{[1]}(1) \end{bmatrix} \begin{bmatrix} x(1) \\ x(2) \\ x(3) \end{bmatrix} + \begin{bmatrix} z^{[1]}(1) \\ z^{[1]}(2) \\ z^{[1]}(3) \end{bmatrix}$$

Here $z^{[k]}(t)$ is the additive noise of user k at slot t. Also note that given the antenna mode switching of user 1 defined by the scheme, and assuming all transmission happen within the a coherence interval in time and frequency, it follows that $h^{[1]}(1) = h^{[1]}(3)$ in equation 3.

Decoding:

Consider first user 1. Because user 1 uses the same antenna mode in slots 1 and 3 (i.e., mode 1 since $a^{[1]}(1) = a^{[1]}(3) = 1$), and the channel experienced is the same over such times, subtracting the received version of slot-3 transmission from the received version of the slot-1 transmission eliminates interference from $s^{[2]}$. The result is $$w^{[1]} = \begin{bmatrix} y^{[1]}(1) - y^{[1]}(3) \\ y^{[1]}(2) \end{bmatrix} \quad \text{(equation 4)}$$

$$= \begin{bmatrix} h^{[1]}(1) \\ h^{[1]}(2) \end{bmatrix} \begin{bmatrix} u_1^{[1]} \\ u_2^{[1]} \end{bmatrix} + \begin{bmatrix} z^{[1]}(1) - z^{(1)}(3) \\ z^{[1]}(2) \end{bmatrix}$$

Similarly consider user 2. Because user 2 uses the same antenna mode in slots 1 and 2 (i.e., mode 1, since $a^{[2]}(1) = a^{[2]}(2) = 1$), subtracting the received version of slot-2 transmission from the received version of the slot-1 transmission eliminates interference from $s^{[1]}$.

Thus, in a general form, after interference elimination, receiver k (for k=1 and 2) has a measurement signal of the form $$w^{[k]} = \begin{bmatrix} h_1^{[k]} \\ h_2^{[k]} \end{bmatrix} s^{[k]} + \begin{bmatrix} z_1^{[k]} \\ z_2^{[k]} \end{bmatrix} \quad \text{(equation 5)}$$

whereby the $z_m^{[k]}$ represents noise.

From Example 1 note that in each case $z_1^{[k]}$ represents the sum of two noise terms (that from slots 1 and 3 for user 1, and that from slots 1 and 2 for user 2). Thus, due to the interference cancellation and the independence of such noise, the power of $z_1^{[k]}$ is twice as large as $z_2^{[k]}$. This means that while the BIA scheme has good properties in eliminating interference and increasing DoFs, it can have impaired performance for low SNR (or low SINR) users due to this noise enhancement.

Power Allocation Improvements

To improve the BIA scheme, one can consider directly the definition of $z_m^{[k]}$ in equations 4 and 5 of Example 1. The problem of noise enhancement arises due to the alignment process of streams. Also note that from equation 1 that the t Block of Type-1 sent over x(1) is sending the sum of two streams. If streams have the same power, this means that the power required to transmit x(1) is twice that of x(2) or x(3).

In the case of BIA, the power imbalance has another consequence, which can be seen both theoretically and practically. Because streams $s_1^{[k]}, s_2^{[k]}, \ldots, s_N^{[k]}, k=1, \ldots, K$, are given equal power in all transmissions, alignment (cancelling) of interference requires direct (unsealed) differences of received signals at the receiver. Thus, in the alignment in equation (4) with K=M=2, the noise component in one dimension of the aligned stream essentially doubles in power. This problem gets increasingly worse with increased M and K.

In one embodiment, transmitters adjust individually transmit power of transmitted streams as a function of alignment blocks. This adjustment may include scaling of transmission power of at least one transmission per transmission slot so that streams in different slots have approximately the same power. In one embodiment, at least one of the transmitters scales down transmission power associated with a "sum" of streams slot (block type 1) being transmitted in the BIA scheme relative to transmission of other frames (type 2). In another embodiment, at least one of the transmitters adjusts transmit power per block of symbols, including varying the relative transmit power allocated to symbols in different alignment block slots.

To more clearly illustrate this technique, the following transmission vectors define a new scheme:

$$v = \begin{bmatrix} v(1) \\ v(2) \\ v(3) \end{bmatrix} \text{ where} \quad \text{(equation 6)}$$

$$\left[ v(1) = \sqrt{\frac{4}{3}} \frac{1}{\sqrt{2}} (s^{[1]} + s^{[2]}) \right] \leftarrow \text{Scaled Block type-1}$$

$$\begin{bmatrix} v(2) = \sqrt{\frac{4}{3}} s^{[1]} \\ v(3) = \sqrt{\frac{4}{3}} s^{[2]} \end{bmatrix} \leftarrow \text{Block type-2}$$

In equation 6, a relative scaling factor of $1/\sqrt{2}$ is applied to Block 1. Furthermore, to maintain the same power over the three slots as in equation 1, an additional scaling of $\sqrt{(4/3)}$ is required. The result is a new vector v in which all transmission slots (transmitted blocks) have the same expected power for equal power streams $s^{[k]}$.

Note, the sum power over all transmission in equation 10 is still the same as in equation 3. In equation 3, there were 4 streams, each with relative power 1, giving a relative sum power of 4. In equation 10, the 4 streams have a sum power of 4 noting $$\left(\sqrt{\frac{4}{3}}\sqrt{\frac{1}{2}}\right)^2 + \left(\sqrt{\frac{4}{3}}\sqrt{\frac{1}{2}}\right)^2 + \left(\sqrt{\frac{4}{3}}\right)^2 + \left(\sqrt{\frac{4}{3}}\right)^2 =$$
$$\frac{4}{6} + \frac{4}{6} + \frac{4}{3} + \frac{4}{3} = \frac{24}{6} = 4$$

With the scaling, the received vector now has form $$\hat{y} = \begin{bmatrix} \hat{y}^{[1]}(1) \\ \hat{y}^{[1]}(2) \\ \hat{y}^{[1]}(3) \end{bmatrix} \quad \text{(equation 7)}$$

$$= \begin{bmatrix} h^{[1]}(1) & 0 & 0 \\ 0 & h^{[1]}(2) & 0 \\ 0 & 0 & h^{[1]}(1) \end{bmatrix} \begin{bmatrix} v(1) \\ v(2) \\ v(3) \end{bmatrix} + \begin{bmatrix} z^{[1]}(1) \\ z^{[1]}(2) \\ z^{[1]}(3) \end{bmatrix}$$

$$= \sqrt{\frac{4}{3}} \begin{bmatrix} \frac{1}{\sqrt{2}} h^{[1]}(1) & 0 & 0 \\ 0 & h^{[1]}(2) & 0 \\ 0 & 0 & h^{[1]}(1) \end{bmatrix} \begin{bmatrix} x(1) \\ x(2) \\ x(3) \end{bmatrix} + \begin{bmatrix} z^{[1]}(1) \\ z^{[1]}(2) \\ z^{[1]}(3) \end{bmatrix}$$

For user 1, the alignment process still requires using slot 1 and 3, but now direct subtraction is not sufficient; there has to be scaling applied. With correct scaling, the result is $$r^{[1]} = \begin{bmatrix} \sqrt{2}\hat{y}^{[1]}(1) - \hat{y}^{[1]}(3) \\ \hat{y}^{[1]}(2) \end{bmatrix} \quad \text{(equation 8)}$$

$$= \sqrt{\frac{4}{3}} \begin{bmatrix} h^{[1]}(1) \\ h^{[1]}(2) \end{bmatrix} \begin{bmatrix} u_1^{[1]} \\ u_2^{[1]} \end{bmatrix} + \begin{bmatrix} \sqrt{2}z^{[1]}(1) - z^{[1]}(3) \\ z^{[1]}(2) \end{bmatrix}$$

Or equivalently, the following can be considered:

$$g^{[1]} = \begin{bmatrix} h^{[1]}(1) \\ h^{[1]}(2) \end{bmatrix} \begin{bmatrix} u_1^{[1]} \\ u_2^{[1]} \end{bmatrix} + \sqrt{\frac{3}{4}} \begin{bmatrix} 2z^{[1]}(1) - z^{[1]}(3) \\ z^{[1]}(2) \end{bmatrix} \quad \text{(equation 9)}$$

Relative to equation 4, the result of the scaling as seen in equation 9 is that the power of noise in the first element of $g^{[1]}$ has a slight increase from 2 to 9/4. However, the second element of $g^{[1]}$ has a corresponding reduction in noise from 1 to ¾. Note, this noise increase and reduction is also seen in the corresponding elements of the aligned signal of user 2.

Together this may not have an appreciable effect for some cases such as (M K)=(2, 2). (For this case, there is also some rate gain although it is just a little. For many other cases, the noise level at each antenna can be decreased). However, for large "K", the noise as shown in equation 4 is amplified not two-fold, but K-fold. Furthermore, in the original BIA process, the first transmitted frame (unscaled) in the corresponding equation 3 is not twice the power, but K-times the power. Thus, when equalizing transmissions with larger K, more aggressive scaling is used, the benefits of reducing various noise terms increase, and the improvement seen increases. The result is improved performance.

It can be shown that as K increases, the benefit of the approach becomes more apparent. Note the cross-points where BIA improves over SU-MISO moves from around the 16 to 17 dB range in the original BIA scheme down to the 7 dB to 10 dB range.

As discussed above, in one embodiment, the power allocated to each symbol δ is changed as a function of the alignment block type. For purposes herein, the symbol a denotes the ratio of the power used for transmitting a user symbol in alignment block 1 over the corresponding power in alignment block 2. In one embodiment, the power ratio δ is chosen to control the noise enhancement levels and improve the effective SU-MIMO channel obtained after zero-forcing interference.

In the (M=2; K≥2) case, K+1 slots are used to transmit K+1 two-dimensional symbols. In this case, the $n^{th}$ transmitted vector symbol x(n) is given by $$x(1) = \sqrt{\delta}\Sigma_{k=1}^{K} u^{[k]} \text{(slot one)} \quad (10)$$

$$x(n) = u^{[n-1]} \text{ for } 2 \leq n \leq K+1. \quad (11)$$

The two receiver modes at receiver k are cycled through the same user-specific way as with the original BIA scheme to enable blind interference alignment of the interfering streams. In particular, user k uses mode 1 on all slots except slot n=k+1 and obtains a set of measurements. The interference from other user streams can be then canceled out by taking a linear combination of the K measurements in the measurement set in a manner well-known in the art.

Combining BIA with Cluster-Based Transmission

In one embodiment, a wireless communication system employing BIA includes cluster transmission. In such a system, base stations are grouped in different clusters over different resource elements in the time-frequency plane according to cluster patterns. For example, the cluster patterns may include a first cluster pattern used on a first frequency band and a second cluster pattern used on a second, different frequency band. Alternatively, the cluster patterns may include a first cluster pattern used in a first time slot and a second cluster pattern used in a second, different time slot. This could be with the same or a different frequency band. Still further, the cluster patterns may include a first cluster pattern used for transmissions with a first code and a second cluster pattern used for transmissions with a second, different code. Note that although the above embodiments only set forth two cluster patterns, it would be apparent that more than two cluster patterns (e.g., three, four, etc.) could be included and used.

The use of such a clustering technique, in cooperation with the power allocation scheme described above, allows BIA to be applied successfully (with advantages over SU-MISO) to many users in a cellular environment.

To show the benefit of the cluster scheme set forth herein combined with BIA, for simplicity let us focus on two groups of users:

a. users near transmitting base-stations (BSs), termed "cell-center" users, and b. users near the edge of a cell, or are near equidistant from two or more BSs, termed "cell-edge" users.

All other users in the system can be understood by looking at these two classes which represent "best case" and "worst case" users respectively.

In a cellular (non-cluster) transmission, a user is served by only one BS. Thus, cell-edge users get interference from BSs that are almost the same distance away as their serving BS. Thus, their SINRs are often on the order of 0 dB or lower, rendering BIA, even with the above improvements, unattractive.

Figure 2:
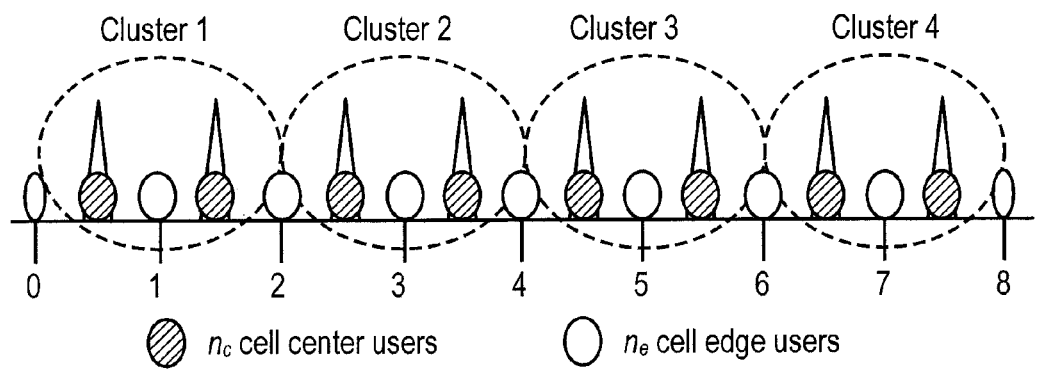
FIG. 2 illustrates a 1-dimensional illustration of a cluster transmission strategy indicating locations of stations (triangles), locations of cell-center and cell-edge users (solid ovals), and clusters for a cluster size of 2 base-stations (dashed ovals).

FIG. 2 illustrates a cellular layout in 1-dimension (1D). In this case, the illustration is in 1D for simplicity; equivalent illustrations in 2 dimensions follow. Referring to FIG. 2, locations of stations (triangles), locations of cell-center and cell-edge users (solid ovals), and clusters for a cluster size of 2 base stations (dashed ovals) are shown along an x-axis, with distances along the x-axis being relative distances where a unit in the x-direction can be assigned a given meaning in an absolute distance scale. Such a scale is not important for the illustration.

To illustrate the benefit clusters provide, assume without loss of generality that the BSs in FIG. 2 are located at points p+0.5 for integer p, e.g., points −0.5, 0.5, 1.5, 2.5, ..., 7.5.

Consider strictly cellular transmission. In such a case, only one BS serves any given user. For cell-center users, it is well understood by those familiar with the state of the art that such users achieve SINRs that can be very high. This is because the distance to the serving BS can be much smaller than the distance from interfering stations, even the nearest such interfering station. The resulting SINR is high due to the attenuation of the transmitted signals with distance due to pathloss. However, given the relative distances, interfering transmissions are attenuated by a much larger factor than the useful signal transmissions from the serving cell.

Now consider one group of cell-edge users. For example, take cell-edge users around location 1. Assume these are served by the station at location 1.5, a relative distance of approximately 0.5 from such users. The dominant interfering station is at location 0.5. This is also a relative distance of approximately 0.5 from such users. Thus, if pathloss is about the same with respect to the two stations, the SINR experienced considering only the interference from the nearest BS is ~0 dB. When considering other interfering stations in addition to the nearest, the SINR can easily go below 0 dB.

If clusters of BSs serve users, one can improve the SINR of users. For example, if such edge-users are served by the two BSs in Cluster 1 in the FIG. 2, i.e. stations at location 0.5 and 1.5, the closest interfering station to the users would be the BSs located at 1.5 and −0.5, a relative distance of approximately 1.5 from such users.

If the distance dependent pathloss function has an $\alpha$, then the interference level in a cluster scenario using clusters of 2 cells relative to a cellular scenario is on the order of $2 \times (0.5/1.5)^{\alpha}$. For $\alpha=3$ this is a reduction by a factor $1/27=11$ dB. Thus, SINRs increase by 11 dB in the cluster case for such cell-edge users. For $\alpha=3.8$, the SINR can improve by 15 dB.

The cluster arrangement in FIG. 2 in fact improves the SINRs for all users in the system. Such an improvement is high for cell-edge users around locations 1, 3, 5, 7. Unfortunately, at cluster-edges, the benefit to users, such as those at locations 0, 2, 4, 6, 8, is small.

Figure 3:
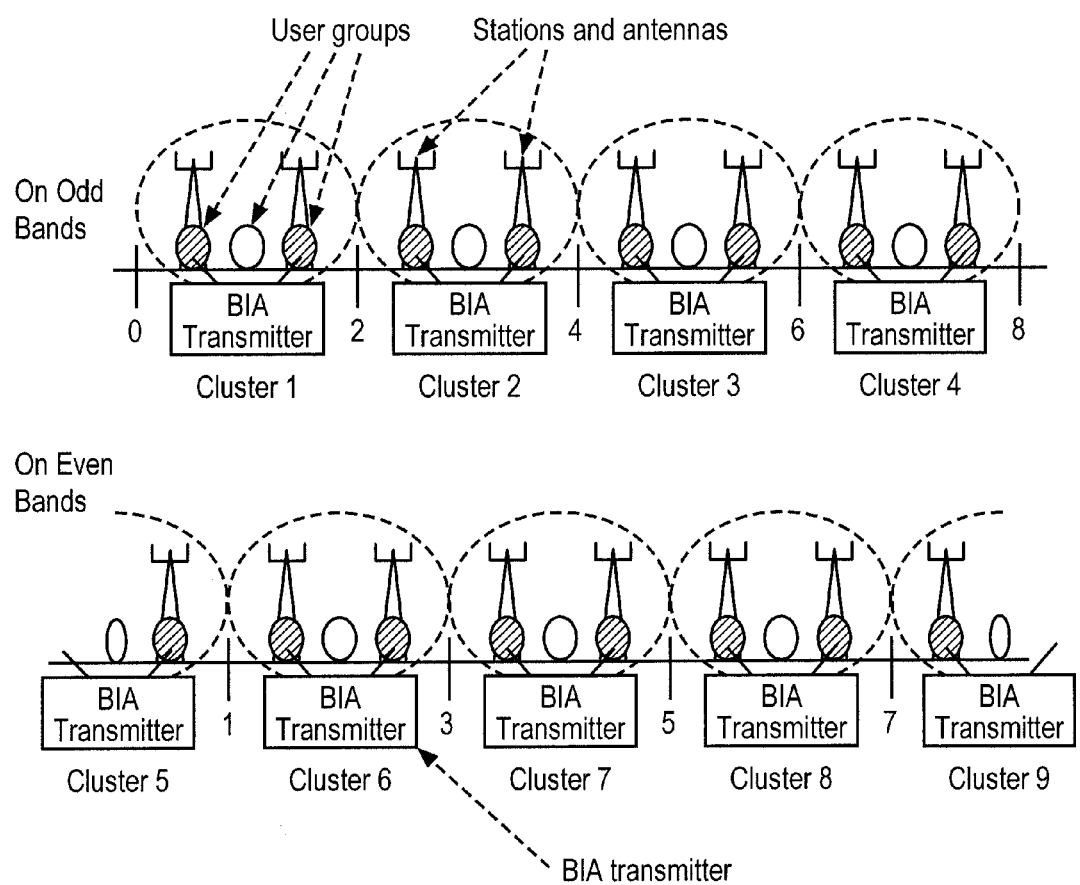
FIG. 3 illustrates a system-wide refinement of FIG. 2 that allows for two different cluster patterns to coexist.

To overcome this problem, in one embodiment, a cluster shifting strategy is used. FIG. 3 illustrates one embodiment of cluster shifting. Referring to FIG. 3, two different cluster patterns exist, with different patterns working on different frequency bands. More specifically, the cluster arrangement in FIG. 2 also exists in the system of FIG. 3, but it is used in a given frequency band. Concurrent with this arrangement is another (shifted) cluster arrangement using another frequency band. The clustering arrangement can also be deployed in a system in which they use the same frequency bands but operate on different time slots.

Various embodiments of wireless communication systems have different cluster arrangements that operate on different time and/or frequency (e.g., in OFDM or CDMA), and/or code (in CDMA) resources. With these cluster arrangements, all users, one some resource, can see SINRs favorable to BIA on at least one resource.

Figure 4:
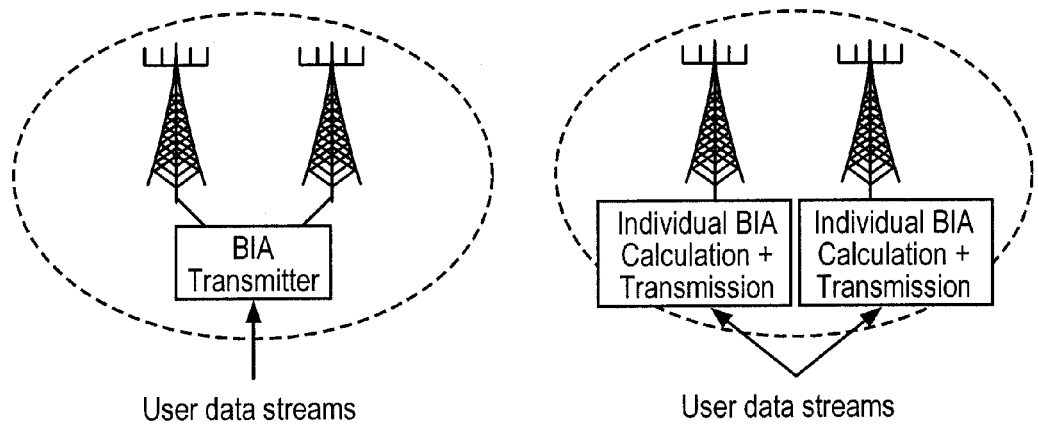
FIG. 4 illustrates the BIA cluster transmitter as being implemented by two separate modules that can operate independently at each station.
Figure 4:
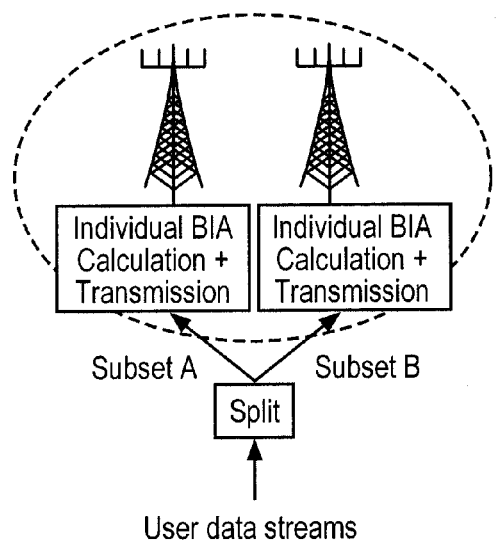

Furthermore, there are other very important deployment advantages of BIA over traditional CSIT-based MU-MIMO when using clusters. Note that in any cluster arrangement, the BSs in a cluster require only the information streams of users it serves in order to create the necessary signal for transmission. FIG. 4 illustrates a BIA cluster transmitter being implemented by two separate modules which operate independently at each station. Referring to FIG. 4, in one embodiment, the user data streams are sent to multiple, individual BIA calculation and transmission transmitters, each having coding and modulation functionality. In another embodiment, also depicted in FIG. 4, the user data streams are split by a split module and separate subsets, A and B, are sent to separate BIA transmitters. In one embodiment, the split module is located at the same location as one of the transmitting base-stations. In another embodiment, the split module is located at a node independent of the two nodes and at a different location. Alternatively, both stations can have access to the full stream. In that case, each station could either use only a subset of information symbols to generate from it its own coded symbols independently, or, both base-stations could use a code on the whole-stream to generate their coded symbols that are then passed to the BIA code module.

As a specific example of such a case take Cluster 1 of FIG. 2, and assume each BS has M'=1 antenna. Across the two BSs, there are M=2 antennas. Both BSs at locations 0.5 and 1.5 are able to define their respective transmission signal by using either equation 1 (original BIA) or equation 10 (improved BIA) once they have the original information bits that need to be transmitted to each user. These bits define the "$u_i^{[k]}$" values and thus the "$s^{[k]}$" values. The only thing to note is that one BS will carry the signal to be applied to transmission antenna i=1, and the other BS will carry the signal to be applied to transmission antenna i=2. For the case each station has M"=2 antennas, there exists a corresponding BIA scheme for (M K")=(4, K") for K" selected by the system.

Note that, although in general, it is preferable that $u_1^{[k]}$ and $u_2^{[k]}$ are a partition of the coded symbols generated from an encoding of a single information bearing source, a host of other cases that could also be of interest are readily enabled by the BIA schemes. In one such case, for instance, $u_1^{[k]}$ and $u_2^{[k]}$ represent two distinct coded streams, each generated from a different group of information bearing symbols. In that case, each BS in the cluster would only need to know the associated information bearing stream and can separately perform its one encoding. Thus, in other cases, it is possible to formulate transmissions in which each BS only receives a subset of the total information bits (as illustrated in FIG. 4). For example, the coded streams may be formed in layers, as in an H-BLAST system, with some layers coming from one BS, and others from other BSs. The single information bearing source may comprise a base station controller feeding both base stations. In another embodiment, the full information stream is passed to each base-station and each base-station generates its own coded data stream (base-station specific) for transmission over the BIA coding structure.

Figure 5:
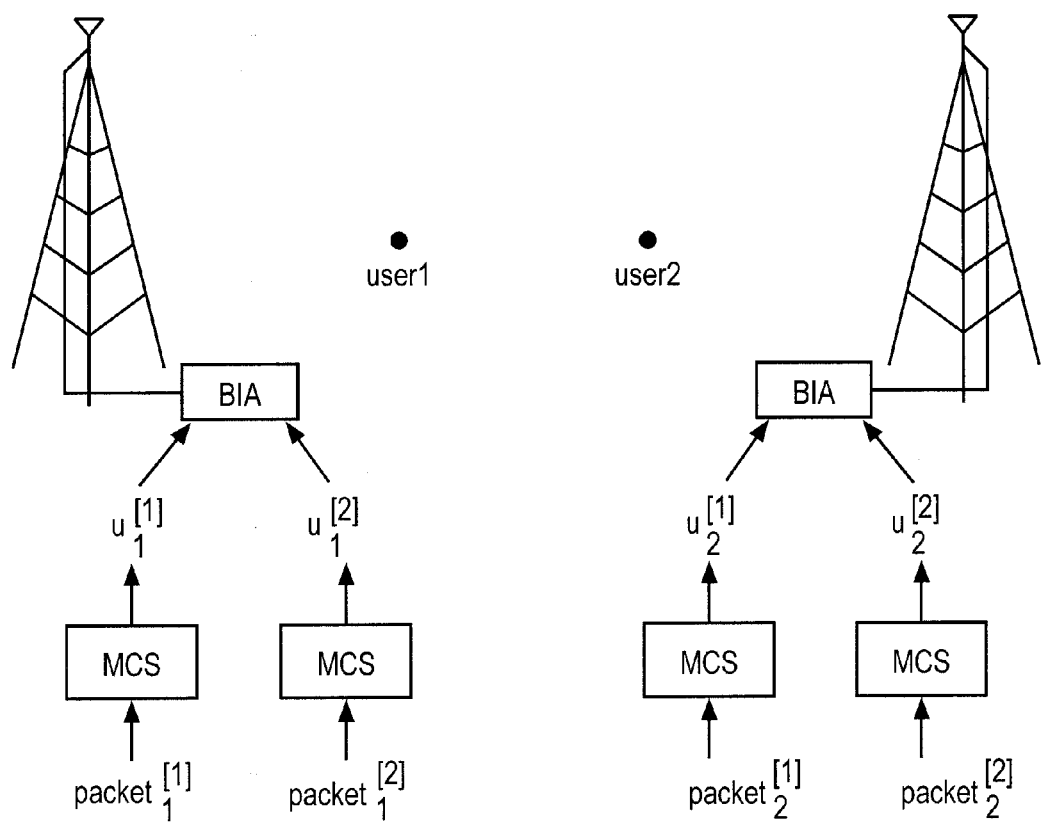
FIG. 5 illustrates a cluster-based scheme and $N_t=1$ antenna per base-station, with reuse-2 and shifted clusters of size 2, using the (M,K)=(2,2) BIA code.
Figure 6:
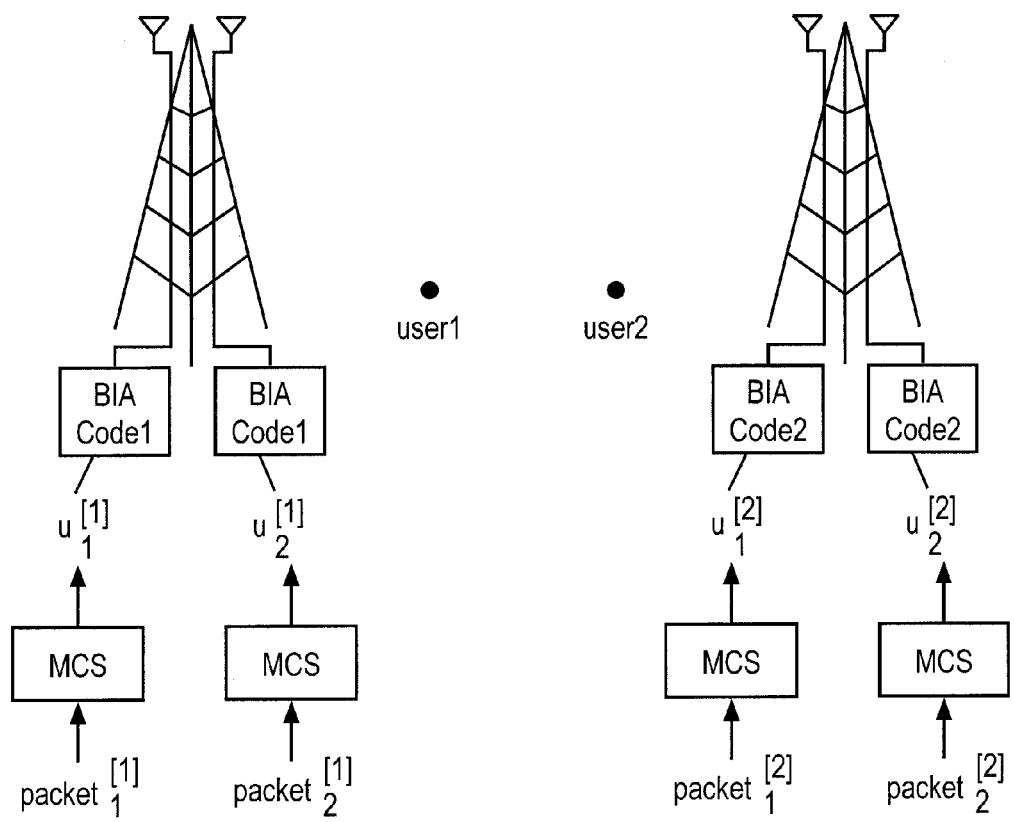
FIG. 6 illustrates a cellular scheme with code-reuse 2 with $N_t=2$ antennas per base-station, using the (M,K)=(2,2) BIA code.

FIGS. 5 and 6 illustrate the above cluster arrangements. FIG. 5 illustrates a cluster of size 2, with $N_t=1$ antenna per base-station, using the code (M,K)=(2,2) BIA code. Referring to FIG. 5, "packet$_i^{[k]}$" refers to the $i^{th}$ uncoded data packet for user k, MCS the modulation/coding scheme used, and BIA (the arithmetic operations required to correctly combine coded symbols for transmission). Thus, each has its own code, modulation, and BIA scheme which, though designed jointly, operate separately. By splitting the antennas of one cell between two cells, each station now has a single antenna ($N_t=1$). Specifically, each station (antenna) can operate using independent data packets and independent coded streams, and their streams do not interfere with each other because they are designed jointly to zero force each other out. This is unlike the application of traditional MU-MIMO techniques, such as LZFB, to clusters as often done in a Network MIMO. For LZFB, common coded streams have to be shared between stations in order to apply the necessary precoding determined by beamforming vectors. Furthermore, under some conditions accounting for CSIR and CSIT overheads, BIA can in fact outperform LZFB in cluster operations.

One can take the case of FIG. 5, which assumes cluster-operation with shifted cluster arrangements, and rearrange packets and BIA-codes so that each station only serves one user on one code. This is a cellular scheme with code-reuse 2 with $N_r=2$ as in FIG. 6. An interesting comparison can be made between FIG. 5 and FIG. 6 for users equidistant between the two stations. For such users, assuming the same pathloss and statistically equivalent channels to each station, the performance of both systems is equivalent. However, as users move away from cluster centers and experience stronger channels to one of the two stations, the system in FIG. 6 (which has twice as many antennas per base-station) would perform better.

The performance of the cluster-based scheme can also be improved by exploiting properly tuned power allocation between the two user streams provided to a given user such that more power is allocated for transmission to the stream (antenna) that emanates from the base station closer to the user. Such power allocation can in general be optimized for maximizing the delivered rate to the user subject to a transmit power constraint on the user stream. In general, given knowledge of the relative nominal received signal strength that a user sees from each base-station in the cluster, the nominal noise level and available transmit power for the user stream, it is possible to optimize this power ratio to maximize the rate delivered to the user. In practice, the base station can use a predetermined set of ratios and switch between the available options in a predetermined manner based on (possibly coarse) information on the user nominal SNRs from each base-station. For instance, referring to the base-station closest to user 1 as BS-1, and to the base-station closest to user 2 as BS-2 in FIG. 5, in one embodiment, the power allocated to the user 1 symbols on the BS-1 and the BS-2 antenna would be $P_H$ and $P_L$, respectively, on alignment block 2, and $P_H/2$ and $P_L/2$, respectively, on alignment block 1. In contrast, the power allocated to the user 2 symbols on the BS-1 and the BS-2 antenna would be $P_L$ and $P_H$, respectively, on alignment block 2, and $P_L/2$ and $P_H/2$, respectively, on alignment block 1. As a result, over the 3 slots comprising the M=2, K=2, code, each BS transmits once at power $P_H$, once at power $P_L$, and once at a power $P_{avg}$, where $P_{avg}=P_L+P_H$. Thus, the average per-BS transmission power per slot in the 3-slot BIA transmission would be $P_{avg}=P_L+P_H$. In contrast to the constant transmit power BIA scheme where each antenna transmits at power $P_{avg}$ on every slot (i.e., where $P_H=P_L=P_{avg}/2$), a power allocation scheme would choose a $P_H>P_L$ so as to take advantage of the proximity of each user to its own base-station. Note that by multiplexing different BIA transmissions over several frequency bands, the transmit power per BS per time-"band" over the entire bandwidth can be made constant. Consider for example, the arrangement in FIG. 5, where over one band users 1 and 2 are served with the BIA code, and over another (with the same bandwidth) users 1' and 2' are served. As long as, within the time duration where "BIA block-type 1" transmission occurs for user 1 (user 2) and "BIA block-type 1" transmission occurs for user 2' (user 1'), the overall scheme will have the power-allocation benefits of the earlier (single-band) scheme, while maintaining constant transmission power over time.

Figure 7:
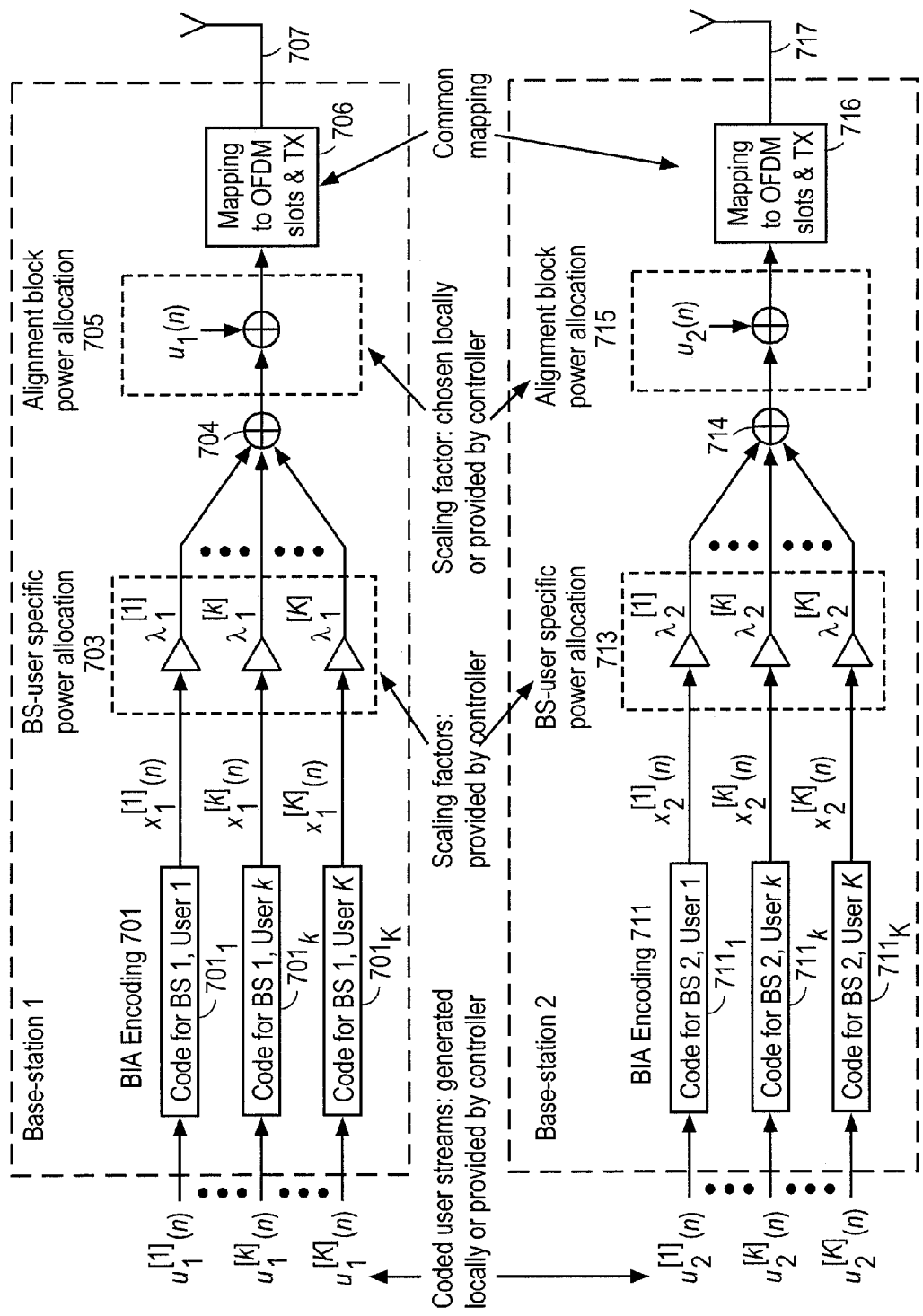
FIG. 7 is block diagrams of one embodiment of each of two base stations.

FIG. 7 illustrates block diagrams of one embodiment of each of two base stations. Referring to FIG. 7, each base station receives coded user streams. In one embodiment, the coded user streams are generated locally. In another embodiment, the coded user streams are provided by a controller. Each of the coded user streams are coded using coding and modulation units such as described above, which code each user stream received by the base station. Different base stations can use the same coding and modulation to generate the transmission signals that they simultaneously transmit for a given user. However, different base stations can use different coding to create the coded user streams that are input into the base station. For example, base station 1 may use 64 QAM, while base station 2 uses 16 QAM to generate coded streams for a particular user. Thus, the code structure of the coded user streams being received by base stations 1 and 2 may be different but the BIA encoding performed by both base stations is the same.

Base station 1 receives coded user stream $u_1^{[1]}(n)-u_1^{[K]}(n)$. Each of the user streams is received by a separate BIA encoding unit 701. BIA encoding unit 701 performs BIA encoding for each user using a separate code. The outputs of each of the BIA encoders $701_1$-$701_K$ are input to base station-user specific power allocation block 703. In base station-user specific power allocation block 703, each BIA encoded stream is scaled with a scaling factor as described above. In one embodiment, this scaling factor is provided by a base-station controller. The scaled BIA-encoded streams are combined using combiner 704 in a manner well-known in the art. Thereafter, the combined BIA-encoded and scaled streams undergo optional alignment block power allocation from alignment block power allocation unit 705, which applies a scaling factor to the combined BIA encoded and scaled data stream as described above. In one embodiment, the scaling factor is chosen locally by the base station. In another embodiment, the scaling factor is provided by a base station controller residing outside the BS and possibly controlling multiple BS the scaling factors over multiple base-stations. In one embodiment, the alignment block power allocation unit 705 comprises a mixer that applies a scaling factor $\mu_1(n)$. The scaled user data output from alignment block power allocation unit 705 undergoes mapping to OFDM slots and transmission via OFDM transmitter 706, which wirelessly transmits the data on antenna 707.

Base station 2 receives coded user stream $u_2^{[1]}(n)-u_2^{[K]}(n)$. Each of the user streams is received by a separate BIA encoding unit 711. BIA encoding unit 711 performs BIA encoding for each user using a separate code. The outputs of each of the BIA encoders $711_1$-$711_K$ are input to base station-user specific power allocation block 713. As described above, in base station-user specific power allocation block 713, each BIA encoded stream is scaled with a scaling factor as described above. In one embodiment, this scaling factor is provided by a base station controller. The scaled BIA-encoded streams are combined using combiner 714 in a manner well-known in the art. Thereafter, the combined BIA-encoded and scaled streams undergo optional alignment block power allocation from alignment block power allocation unit 715, which applies a scaling factor to the combined BIA encoded and scaled data stream as described above. In one embodiment, the scaling factor is chosen locally at the base-station. In another embodiment, the scaling factor is provided by a base station controller. In one embodiment, the alignment block power allocation unit 715 comprises a mixer that applies a scaling factor $\mu_1(n)$. The scaled user data output from alignment block power allocation unit 715 undergoes mapping to OFDM slots and transmission via OFDM transmitter 716, which wirelessly transmits the data out on antenna 717. The streams undergo common mapping to the OFDM slots with each of the base stations.

Figure 8:
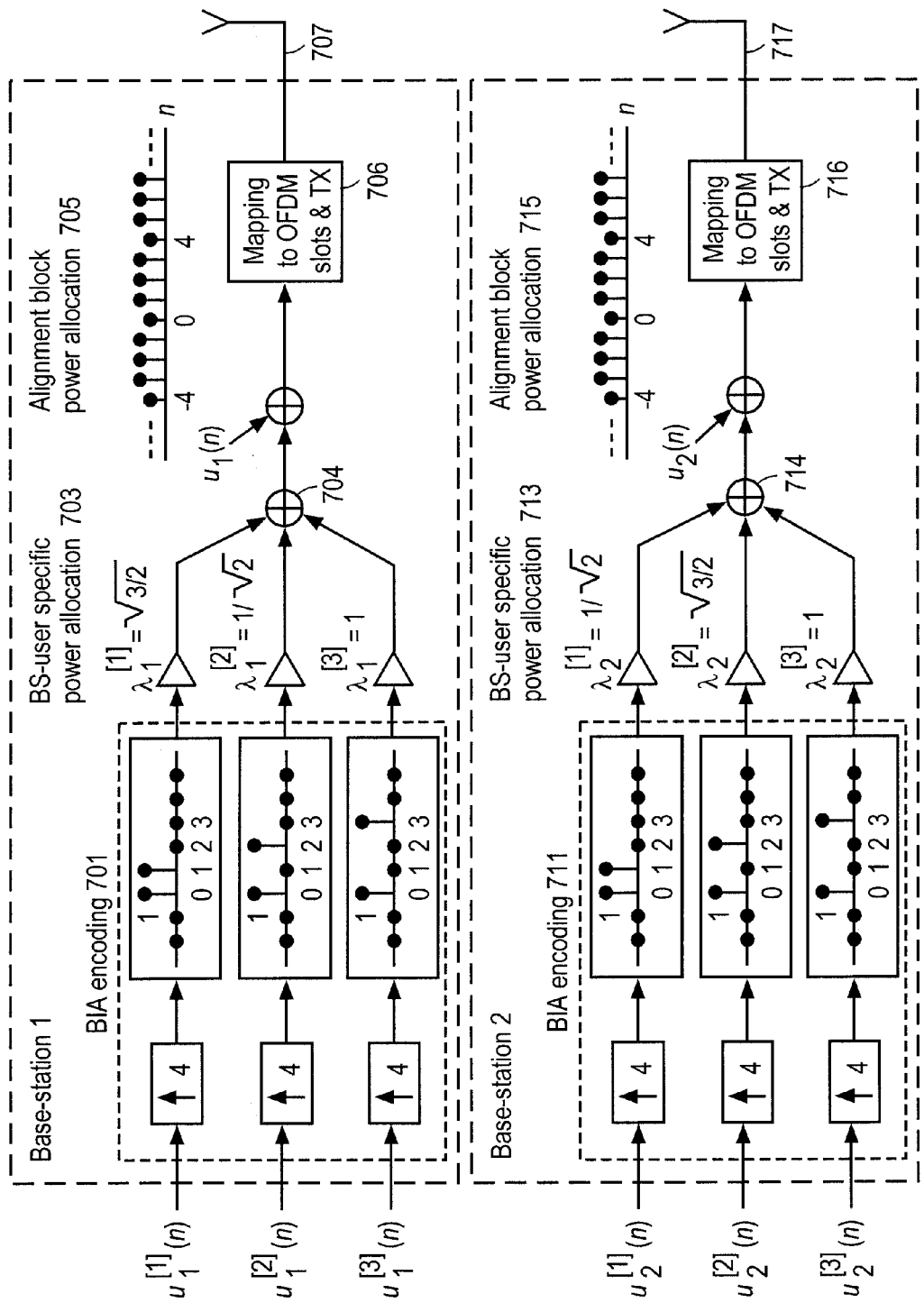
FIG. 8 is a block diagram illustrating a processing example with the two base stations of FIG. 7.

FIG. 8 illustrates the base stations 1 and 2 of FIG. 7 being used in a specific example in which the cluster of the two base-stations jointly transmits to three users over a common set of OFDM resource elements using a 3-user BIA code. Each base station receives three coded user streams, one per user. Each of these streams undergoes BIA encoding followed by base station-user specific power allocation and alignment block power allocation. The BIA encoding upsamples each of the user streams by 4 and then applies a filter to the upsampled coded user stream to output the samples that are sent to base station-user specific power allocation. In this case, base station 1 applies a scaling factor of $\sqrt{3/2}$ (square root of 3/2) to the first user stream, a scaling factor of $1/\sqrt{2}$ (square root of ½) to a second user stream and a unity scaling factor (1) to the third user stream. Thereafter, the streams are combined and undergo alignment block power allocation, mapping to OFDM slots and then transmission. Similarly, base station 2 performs BIA encoding on three coded user streams, and applies a scaling factor of $\sqrt{3/2}$ (square root of 3/2) to a first user stream, a scaling factor of $1\sqrt{2}$ (square root of ½) to a second user stream and a unity scaling factor to the third user stream. Thereafter, the streams are combined, undergo alignment block power allocation, mapping to OFDM slots and transmission. Note that the average transmit-power per base-station is the same over the slots allocated to the three-user transmission. However, the coded stream for user 1 from base-station 1 is transmitted at three times the transmission power of the user's coded stream from base-station 2, while the coded stream for user 2 from base-station 1 is transmitted at one-third of the transmission power of the user's coded stream from base-station 2. Also the user 3's streams transmitted from the two base-stations have equal power.

Finally, a subtle point to make concerns the number of antenna modes required by different systems. All receivers (users) in all schemes of FIGS. 5 and 6 require only M=2 antenna modes. Thus, from the point of view of user hardware, such schemes are roughly comparable. However, the cluster scheme uses $N_r=1$ while cellular user N=2. In order for the cluster scheme to make full use of $N_r=2$ one would have to consider more antenna modes at the user using schemes (M, K) with M=4.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A wireless communication system comprising:
a plurality of receivers, each receiver in the plurality having a multi-mode antenna with a single radio frequency (RF) chain that is operable in a plurality of antenna modes, wherein each receiver shifts between the plurality of antenna modes in a predetermined receiver-specific manner; and
a plurality of base stations to perform cluster-based transmission, wherein each base station in the plurality of base stations has one or more transmitters having a transmit antenna and being operable to communicate with one or more of receivers in the plurality of receivers using a blind interference alignment (BIA) scheme, and wherein the plurality of base stations are grouped in different clusters over different resource elements in the time-frequency plane according to cluster patterns.

2. The wireless communication system defined in claim 1 wherein the cluster patterns comprises a first cluster pattern used on a first frequency band and second cluster pattern used on a second frequency band different than the first frequency band.

3. The wireless communication system defined in claim 1 wherein the cluster patterns comprises a first cluster pattern used in a first time slot and second cluster pattern used in a second time slot different than the first time slot.

4. The wireless communication system defined in claim 1 wherein transmitters of the plurality of transmitters adjust individually transmit power of transmitted streams as a function of the alignment blocks in the BIA scheme.

5. The wireless communication system defined in claim 4 wherein at least one of the transmitters scales transmission power of at least one transmission so that streams in different slots have the same power.

6. The wireless communication system defined in claim 4 wherein at least one of the transmitters scales down transmission power associated with transmission frames being transmitted in the BIA scheme, where multiple symbols intended for multiple users are simultaneously transmitted relative to transmission of other frames involving the transmission of a single symbol, where each symbol of the multiple symbols is intended for a different user.

7. The wireless communication system defined in claim 4 wherein at least one of the transmitters adjusts transmit power per transmission slot.

8. The wireless communication system defined in claim 4 wherein at least one of the transmitters adjusts transmit power per block of symbols.

9. The wireless communication system defined in claim 4 wherein the power used for transmitting a user symbol in alignment block 1 and the corresponding power in alignment block 2 are chosen so that their ratio equals a given value that is different from the value 1 for at least one of the users.

10. The wireless communication system defined in claim 1 wherein each user stream being transmitted from at least a first of the plurality of base stations is independently coded from each user stream being transmitted from a second base station in a cluster with the first base station with the exception of the common BIA code operated over both the first and second base stations.

11. The wireless communication system defined in claim 1 wherein the streams for a user that are transmitted from antennas at different base-stations are transmitted with different powers.

12. A method for communicating in a wireless communication system having a plurality of receivers and a plurality of base stations, wherein each receiver in the plurality having a multi-mode antenna with a single radio frequency (RF) chain that is operable in a plurality of antenna modes, and further wherein each base station in the plurality of base stations has one or more transmitters having a transmit antenna and being operable to communicate with one or more of receivers in the plurality of receivers using a blind interference alignment (BIA) scheme, the method comprising:
performing cluster-based transmission with the plurality of base stations to transmit wireless signals to the plurality of receivers using a blind interference alignment (BIA)

scheme while the plurality of receivers shift between the plurality of antenna modes in a predetermined receiver-specific manner, including grouping base stations in different clusters over different resource-elements in the time-frequency plane according to cluster patterns.

13. The method defined in claim 12 wherein the cluster patterns comprises a first cluster pattern used on a first frequency band and second cluster pattern used on a second frequency band different than the first frequency band.

14. The method defined in claim 12 wherein the cluster patterns comprises a first cluster pattern used in a first time slot and second cluster pattern used in a second time slot different than the first time slot.

15. The method defined in claim 12 further comprising adjusting individually the transmit power of transmitters as a function of alignment blocks.

16. The method defined in claim 15 wherein adjusting individually transmit power of transmitters comprises scaling transmission power, by at least one of the transmitters, of at least one transmission so that streams in different slots have the same power.

17. The method defined in claim 15 wherein adjusting individually transmit power of transmitters comprises scaling down transmission power, by at least one of the transmitters, associated with transmission frames being transmitted in the BIA scheme, where multiple symbols intended for multiple users are transmitted relative to transmission of frames involving the transmission of a single symbol.

18. The method defined in claim 15 wherein adjusting individually transmit power of transmitters comprises adjusting, at least one of the transmitters, transmit power per transmission slot.

19. The method defined in claim 15 wherein adjusting individually transmit power of transmitters comprises adjusting, at least one of the transmitters, transmit power per block of symbols.

20. A wireless communication system comprising:

a plurality of receivers, each receiver in the plurality having a multi-mode antenna with a single radio frequency (RF) chain that is operable in a plurality of antenna modes, wherein each receiver shifts between the plurality of antenna modes in a predetermined receiver-specific manner; and a plurality of base stations to perform transmission, wherein each base station in the plurality of base stations has one or more transmitters operating a total of at least two transmit antennas and being operable to communicate with one or more of receivers in the plurality of receivers using a blind interference alignment (BIA) scheme in which each transmitter in a base-station generates a stream based on data intended for one or more of the receivers without using channel state information and in which only one antenna is active at each receiver during a given time slot, and further wherein each of the plurality of base stations comprises a power allocation unit to adjust transmit power of symbols of BIA-encoded user streams.

21. The wireless communication system defined in claim 20 wherein the power allocation unit comprises a base station-user specific power allocation unit operable to adjust the transmit power per block of symbols.

22. The wireless communication system defined in claim 20 wherein the power allocation unit comprises a base station-user specific power allocation unit operable to scale down transmission power associated with transmission frames being transmitted in the BIA scheme, where multiple symbols intended for multiple users are simultaneously transmitted relative to transmission of other frames involving the transmission of a single symbol, where each symbol of the multiple symbols is intended for a different user.

23. The wireless communication system defined in claim 20 wherein the power allocation unit comprises an alignment block power allocation unit operable to adjust individually transmit power of transmitted streams as a function of alignment blocks.

24. The wireless communication system defined in claim 23 wherein the power used for transmitting a user symbol in alignment block 1 and the corresponding power in alignment block 2 are chosen so that their ratio equals a given value that is different from the value 1 for at least one user.

25. The wireless communication system defined in claim 20 wherein the power allocation unit comprises an alignment block power allocation unit operable to scale transmission power of a combination of BIA-encoded user streams so that each combination generated for transmission in different slots have the same power.

* * * * *